United States Patent [19]

Binnig et al.

[11] Patent Number: 4,499,737
[45] Date of Patent: Feb. 19, 1985

[54] METHOD AND DILUTION REFRIGERATOR FOR COOLING AT TEMPERATURES BELOW 1° K.

[75] Inventors: Gerd K. Binnig, Richterswil; Christoph E. Gerber, Adliswil, both of Switzerland

[73] Assignee: International Business Machines Corporation, Armonk, N.Y.

[21] Appl. No.: 472,707

[22] Filed: Mar. 7, 1983

[30] Foreign Application Priority Data

Mar. 23, 1982 [EP] European Pat. Off. ........ 82102407.2

[51] Int. Cl.$^3$ ............................................. F25D 1/00
[52] U.S. Cl. .......................................... 62/56; 62/467; 62/514 R
[58] Field of Search .................... 62/467 R, 514 R, 56

[56] References Cited

U.S. PATENT DOCUMENTS

| | | | |
|---|---|---|---|
| 3,713,305 | 1/1973 | Staas et al. | 62/514 R |
| 3,835,662 | 9/1974 | Staas et al. | 62/514 R |
| 3,896,630 | 7/1975 | Severijns et al. | 62/514 R |
| 3,922,881 | 12/1975 | Staas et al. | 62/514 R |
| 3,978,682 | 9/1976 | Severijns et al. | 62/514 R |
| 4,047,394 | 9/1977 | Severijns et al. | 62/514 R |
| 4,136,526 | 1/1979 | Chanin et al. | 62/514 R |
| 4,136,531 | 1/1979 | Staas et al. | 62/514 R |
| 4,296,609 | 10/1981 | Severijns et al. | 62/514 R |
| 4,297,856 | 11/1981 | Staas et al. | 62/514 R |
| 4,300,360 | 11/1981 | Chanin et al. | 62/514 R |

FOREIGN PATENT DOCUMENTS 444893 2/1968 Switzerland.
527399 10/1972 Switzerland.

OTHER PUBLICATIONS

London et al.: Osmotic Pressure of He$^3$ with Proposals for a Refrigerator to Work Below 1° K., Physical Review, vol. 23, No. 5, Dec. 1962.

Primary Examiner—Ronald C. Capossela
Attorney, Agent, or Firm—Wolmar J. Stoffel

[57] ABSTRACT

The dilution refrigerator operates by sucking a $^4$He-rich mixture from a tank and returning it to the tank through a superleak. Thereby the $^3$He is separated and returned to the $^3$He-rich content of the tank. By this cycling process, a drop in temperature is obtained at the exit of the superleak and through re-mixing of the $^3$He with the $^4$He. Cycling of the liquid $^3$He-$^4$He mixture is performed by a bellows pump maintained in a container 16 at a temperature below 2° K. and by specially designed valves comprising a steel ball as a plug and a gold ring as the valve seat.

12 Claims, 5 Drawing Figures

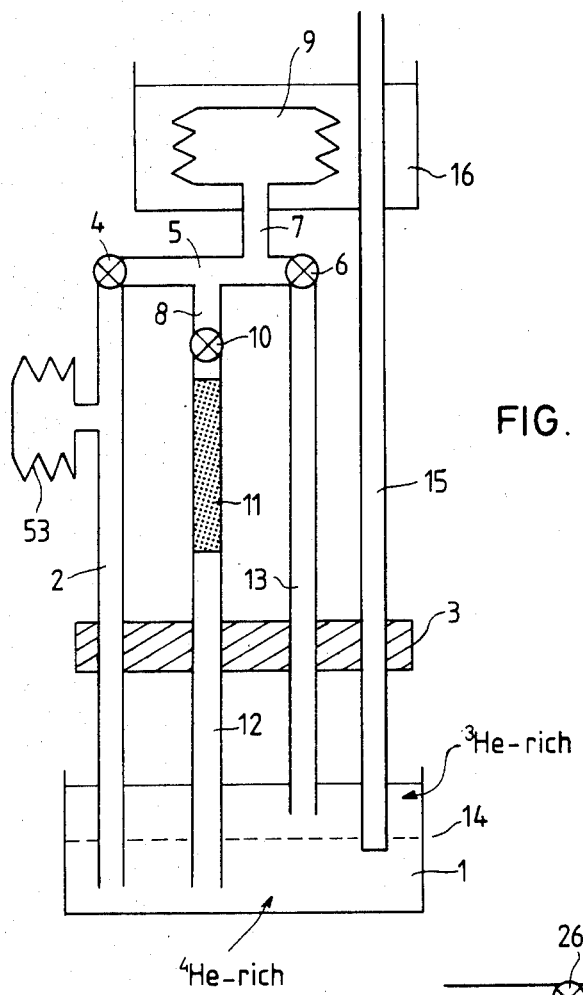
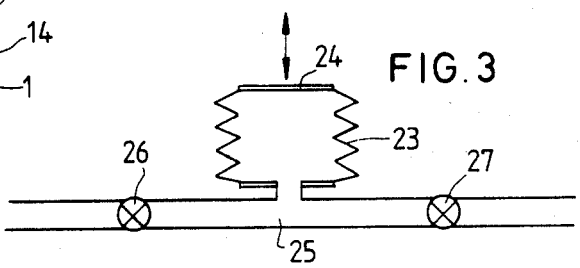
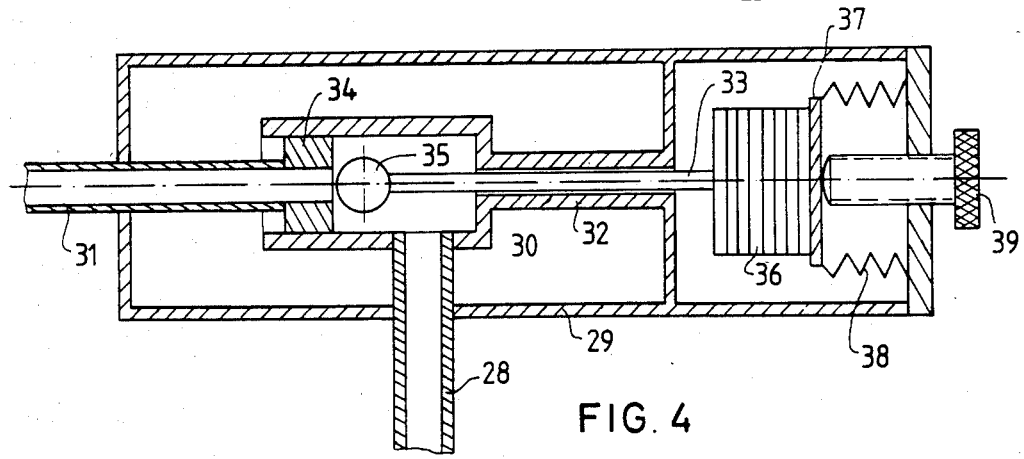

METHOD AND DILUTION REFRIGERATOR FOR COOLING AT TEMPERATURES BELOW 1° K.

DESCRIPTION

1. Technical Field

The invention relates to a method for cooling at temperatures below 1° K. and to a dilution refrigerator for executing said method.

2. Background Art

A dilution refrigerator operates in a cyclic process with adiabatic dilution of liquid $^3$He in $^4$He and with recirculation of reconcentrated $^3$He into a dilution chamber for mixing. In adiabatic dilution, two methods of mixing exist: In one method, the diffusion of the solvent into the concentrated mixture takes place through a semipermeable membrane, in the other method recirculation takes place via a distillation process whereby about $10^{-4}$ mol/sec of gaseous $^3$He is pumped away under its gaseous pressure of about $1.3 \times 10^{-6}$ bar. Outside the cryostat it is then compressed and precooled and afterwards recirculated in liquid form to the dilution chamber via a throttle valve. Thus, the evaporation of the $^3$He takes place in two stages: The first being dilution of the $^3$He by $^4$He, the second the evaporation of the dilute liquid.

Representative of the prior art is Swiss Pat. No. 444.893 which describes a Joule-Kelvin system generating cold at temperatures lower than the temperature corresponding to the pressure behind the pressure reduction device. The latter is designed as an ejector, the output of which is connected via a heat exchanger with the compressor input and via a reduction valve with a tank, the vapor room of which, is connected to the suction input of the ejector.

Swiss Pat. No. 527.399 relates to an improvement over Swiss Pat. No. 444.893 in that a superleak is with one side connected via a heat exchanger (in which the helium is cooled below its lambda temperature) and a reduction valve to a first point in the supply tube, and with its other side is connected to a cooling tank which in turn is connected to a tube (in which the superfluid helium exceeds its critical velocity) to a second point in said supply tube which is under lower pressure than said first point.

Both these patents relate to dilution refrigerators in which the helium returns to the gaseous phase and which, therefore, require big compressors for pumping and compressing on the order of 1000 1/sec of $^3$He gas. The same is true for the refrigerator proposed in the paper "Osmotic Pressure of $^3$He in Liquid $^4$He, with Proposals for a Refrigerator to Work Below 1° K." by H. London, G. R. Clarke and E. Mendoza, Phys. Rev. 128, No. 5, pp. 1992–2005.

DISCLOSURE OF INVENTION

Obviously, the requirement of having large pumping equipment is a severe drawback of the prior art which is avoided by the method of the present invention and by the dilution refrigerator to be described.

Accordingly, the invention concerns a method for cooling at temperature below 1° K. by adiabatically diluting liquid $^3$He in liquid $^4$He and recirculating the re-concentrated $^3$He into the dilution chamber, this method being characterized by pumping the liquid $^3$He-$^4$He mixture from the dilution chamber against a filter permeable only for $^4$He II atoms and returning the reconcentrated $^3$He to the dilution chamber, thereby generating cold at the lower end of said filter and consuming heat by remixing $^3$He with $^4$He, the cold being used in a heat exchanger to precool the returning $^3$He stream.

The dilution refrigerator for performing the above-described method is characterized by at least one pump for sucking a liquid mixture of $^3$He and $^4$He from the dilution chamber and pumping reconcentrated $^3$He back into the dilution chamber depending on the position of at least two valves respectively arranged in the sucking and pumping tubes, by a superleak permeable only for $^4$He II and arranged between said pump and said dilution chamber, and by a heat load tube mounted in close thermal contact with said dilution chamber and said heat exchanger.

BRIEF DESCRIPTION OF THE DRAWINGS

The operability of this refrigerator, however, depends on the availability of a pump and valves which can handle liquid helium. Proposals for these will be made in the course of the following description of preferred embodiments of the invention and with reference to the drawings in which FIG. 1 is a schematic diagram of one embodiment of the refrigerator in accordance with the present invention.

FIG. 3 is a schematic representation of a pump for liquid helium.

FIG. 4 shows an embodiment of a valve for liquid helium.

BEST MODE FOR CARRYING OUT THE INVENTION

Figure 2:
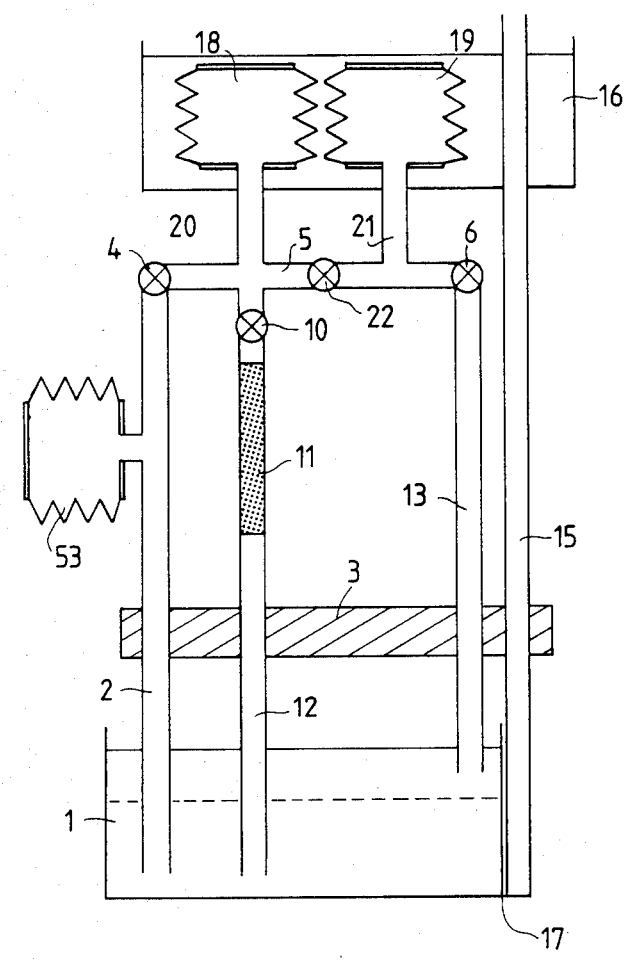
FIG. 2 is a schematic diagram of another embodiment of the refrigerator of FIG. 1.

FIG. 1 shows the basic arrangement of the refrigerator to be described. Into a dilution chamber 1 reaches a vertically arranged tube 2 which passes a heat exchanger 3 and which ends in a valve 4. Extending from valve 4 is a horizontal tube 5 ending in a valve 6 and having two branches 7 and 8, respectively. Branch 7 is connected to a mechanical pump 9 capable of pumping liquid helium and to be described below. Branch 8 leads to a valve 10 to which is connected, via a superleak 11, to a tube 12 reaching into dilution chamber 1. Valve 6 is connected to a tube 13 also reaching into dilution chamber 1.

Pump 9 is assumed to be kept at a temperature below 2° K. This can be achieved by immersing pump 9 in a bath 16 of circulating liquid $^4$He. By opening valve 4, and with valves 6 and 10 closed, and lowering the pressure at branch 7, e.g. by raising a piston or bellows, the $^3$He-$^4$He rich mixture is sucked up from dilution chamber 1 into tube 2 and into pump 9, passing heat exchanger 3. Closing valve 4 and opening valve 10, and at the same time increasing the pressure at pump 9 will result in the superfluid $^4$He being driven through superleak 11 and returned through tube 12 into dilution chamber 1 while all $^3$He remains above superleak 11.

A superleak usually consists of a tube of small inner diameter (about 0.3 m) packed with a fine powder and forming a maze with pores in the order of $10^{-5}$ cm diameter. Since superfluid $^4$He is lacking viscosity, it can pass through a superleak with considerable velocity, while $^3$He cannot penetrate a superleak at all.

As the $^4$He flows through superleak 11, the temperature in the tubing above the superleak is raised, whereas it is lowered in tube 12 and in dilution chamber 1. This is due to the fact that the superfluid $^4$He does not possess any internal energy and, therefore, cannot remove any energy from the tubing from which it flows. Accordingly, the specific internal energy and the corresponding temperature in the liquid remaining above the superleak are increased.

The result of the separation of $^3$He and $^4$He through the exclusive flowing of $^4$He through superleak 11 is the reconcentration of $^3$He in the tubing above valve 10 which is now closed, as is valve 4. Valve 6 opening and pump 9 increasing pressure causes the reconcentrated $^3$He to be pumped out through tube 13 into dilution chamber 1.

In view of the fact that superleak 11 is permeable only for $^4$He 11, valve 10 may be omitted. The result of this will be that as pump 9 lowers the pressure for sucking up the $^3$He-$^4$He mixture through tubes 2 and 5, some of the $^4$He will be drawn up through superleak 11 and immediately evaporate into the tubing 5, 7, 8. Yet the $^3$He-$^4$He mixture will enter tubing 5, 7, 8 instantly via valve 4, such that the loss of efficiency incurred through omission of valve 10 remains very small.

When dilution chamber 1 cools below about 0.8° K., a phase separation occurs in the mixed helium. The reason for this is that at low temperatures the entropy of liquid $^4$He is very small as compared to the entropy of liquid $^3$He, and a mixture of $^3$He in $^4$He may be thought of as a one-component system consisting of $^3$He alone with the $^4$He only altering the volume occupied by the $^3$He. The separation in two phases is then equivalent to a liquid being in equilibrium with a gas. Since the "liquid-phase" $^3$He has a lower density than the "gas-phase" $^4$He, the usual arrangement of gas and liquid in a vessel is turned upside down; the $^3$He-rich mixture is on top of the $^4$He-rich mixture.

As the reconcentrated $^3$He enters dilution chamber 1 through tube 13, it is dissolved in the contents of the chamber. As with most other systems, the dilution occurring results in a temperature drop in dilution chamber 1. The cooling takes place essentially at the interface between the two phases, the same as in a liquid which evaporates at its surface. As the thermal conductivity of both the $^3$He- and $^4$He-rich mixtures is low, the thermal load must be brought in close contact with the phase boundary 14. Accordingly, as shown in FIG. 1, tube 15 is arranged to extend into chamber 1 in proximity with the expected level of the phase boundary when the refrigerator is in operation.

Tube 15 should pass heat exchanger 3 and may also lead through a container 16 in which pump 9 is immersed in a $^4$He bath. Further, to improve the heat transport, tube 15 may be fitted with a conventional sintered-silver cover on its outer side where it is immersed in the $^3$He-$^4$He mixture. As shown in FIG. 2, tube 15 may also be attached externally to dilution chamber 1 and tube 15.

FIG. 2 shows an alternative arrangement of the refrigerator with two pumps 18 and 19 respectively connected via tubes 20 and 21 to tube 5 but separated by an additional valve 22. With valve 4 open and valves 6, 10 and 22 closed, pump 18 can suck up $^3$He-rich mixture from dilution chamber 1 through tube 2. As valve 4 closes and valve 10 opens, the $^3$He content of the mixture can be pressed out through superleak 11 and tube 12 back into dilution chamber 1. The reconcentrated $^3$He mixture from tube 5 is then transferred through open valve 22 into tube 21 and later expelled by pump 19 through valve 6 and tube 13, when valve 22 has closed again. During the latter step, pump 18 can simultaneously suck up $^3$He-rich mixture and again and so forth. This double-cycle process will lead to a better heat exchange.

One essential part of the refrigerator being described is a pump (9, 18, 19) capable of transferring liquid helium against a pressure gradient.

FIG. 3 shows a simple proposal for such a pump comprising a bellows 23 sealed at one end 24 and at the other connected to a pipe 25 closed by two valves 26 and 27, respectively. As the sealed end 24 of bellows 23 is moved up and down, its volume is increased and decreased. With valve 26 closed and valve 27 open, upward movement of end 24 causes a suction through valve 27 and into bellows 23. Closing now valve 27 and opening valve 26 will result in transferring the content of bellows 23 out through valve 26 as bellows 23 is compressed. Since the pump has to work in a cyrogenic environment, actuation of bellows 23 is best achieved by cam means to be described below.

The other important part of the refrigerator is the valve (4, 6, 10, 22). A suitable valve has already been described in the IBM Technical Disclosure Bulletin, Vol. 11, No. 7, page 2896. A further development of that valve is shown in FIG. 4. A tube 28 entering a double-walled enclosure 29 leads into a valve chamber 30 which at its one end has an outlet tube 31 and at its other end a guiding channel 32 for an actuator rod 33. Outlet tube 31 terminates in a sharp-edged annular valve seat 34, and at the tip of actuator rod 33 there is mounted a ball-shaped plug 35. A preferred material pairing for use in a cryogenic environment has been found to be gold for valve seat 34 and steel for plug 35. When plug 35, having a diameter larger than the bore of seat 34, is first dropped into seat 34, the gold is caused to flow so that the seat assumes a shape exactly matching that of the steel ball.

Figure 5:
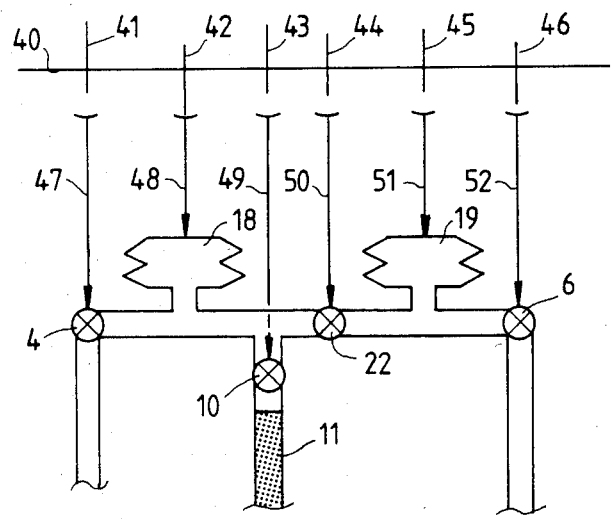
FIG. 5 shows a proposal for the mechanical actuation of valves and pumps from a common cam shaft.

Actuator rod 33 may with its free end to be attached to a pile of piezo-electric plates 36 resting against the seal 37 of a bellows 38 and enclosing a bias screw 39. Screw 39 permits pre-adjustment of the gap between valve seat 34 and plug 35. While bellows 38 prevents any leakage of helium through the threads of screw 39. The pile of piezo-electric plates 36 is conventionally controlled by a voltage sufficient to force plug 35 tightly into seat 34. As sketched in FIG. 5, valves 4, 10, 22 and 6 as well as pumps 18 and 19 may be actuated from a common cam shaft 40 on which cams 41 through 46 are arranged for actuating said valves and pumps via plungers 47 through 52. The cam shaft and its drive motor can be arranged outside of the cryostat. Because of the thermal conductivity decreasing with temperature, not too much heat can enter the system via said plungers.

It has been found that the flow of the helium in the system described is enhanced by operating the system under slight overpressure. Also, in order to avoid any undesired evaporation, an equalization bellows 53 may be provided at tube 2 (FIGS. 1 and 2 so as to permit re-entry of the $^3$He stream through tube 13 into dilution chamber 1 as well as sucking of the $^3$He-$^4$He mixture up tube 2.

While conventional dilution refrigerators typically have a refrigeration power of about 1000 $\mu$W at 100 mK, the refrigerator in accordance with the present invention will easily be distinguished by a factor of $10^3$ (as it will cause no problem to pump 1 cm$^3$/s of liquid helium with the pumps proposed herein, as opposed to the equivalent of 1 mm$^3$/s in conventional systems). Accordingly, the refrigeration power will be on the order of 100 mW in the neighborhood of 100 mK. The final temperature which can be reached with the present refrigerator is about 2 mK.

We claim:

1. Method for cooling at temperatures below 1° K. by adiabatically diluting liquid $^3$He in liquid $^4$He and re-circulating the reconcentrated $^3$He into the dilution chamber, characterized by pumping the liquid $^4$He rich mixture of $^3$He-$^4$He from the dilution chamber (1), separating the $^4$He from the $^3$He-$^4$He rich mixture by placing it in communication with a filter (11) permeable only for $^4$He II atoms and returning the resultant reconcentrated $^3$He rich mixture of $^3$He-$^4$He to the dilution chamber (1), the filtering generating cold at the lower end of said filter (11) and consuming heat by re-mixing $^3$He with $^4$He in the dilution chamber, the cold being used in a heat exchanger (3) to pre-cool the returning $^3$He stream.

2. Method for cooling according to claim 1, characterized by the following cycle of steps:
    (a) sucking $^3$He-$^4$He mixture from the dilution chamber 1 through a first valve (4) by lowering the pressure in the pump (9);
    (b) closing said first valve (4), opening a second valve 10 and pressing the $^4$He component of the $^3$He-$^4$He mixture through the filter (11) back into the dilution chamber (1) thereby generating cold at the lower end of said filter (11);
    (c) opening a third valve (6) and permitting the remaining $^3$He-enriched mixture to return to said dilution chamber (1) and thereby generating cold therein through dissolving the $^3$H-rich mixture in the $^4$He-rich mixture.

3. Method for cooling according to claim 1, characterized by the following cyclically repeated steps:
    (a) sucking the $^3$He-$^4$He mixture from the dilution chamber (1) through a first valve (4) into a first pump (18) by lowering the pressure therein;
    (b) closing said first valve (4), opening a second valve (10) and emitting a portion of $^4$He of the $^3$He-$^4$He mixture through the filter (11), thereby generating cold at the lower end of said filter (11);
    (c) opening a third valve (22) and permitting the $^3$He-enriched content of the first pump 18 to enter a second pump (19);
    (d) closing the third valve (22), opening a fourth valve (6), pumping the $^3$He-rich content of said second pump (19) into said dilution chamber (1) thereby generating cold therein through dissolving the $^3$He-rich mixture in the $^4$He-rich mixture, and at the same time again performing step (a).

4. Dilution refrigerator for cooling at temperatures below 1° K. with a dilution chamber for adiabatically diluting liquid $^3$He in $^4$He, with tubing for recirculating and reconcentrating helium, and with a heat exchanger arranged to extract heat from said tubing, characterized by
    at least one pump for removing a liquid mixture of $^3$He and $^4$He from the dilution chamber, and pumping and reconcentrating $^3$He back into the dilution chamber,
    said dilution chamber having an upper portion containing a $^3$He rich mixture of $^3$He and $^4$He, and a lower portion containing a $^4$He rich mixture of $^3$He and $^4$He in intimate contact along an interface with said $^3$He rich mixture,
    said tubing including sucking tubing in communication with said lower portion of said dilution chamber, pumping tubing in communication with said sucking tubing and said pump, a superleak permeable only to $^4$He II in communication with said lower portion of said dilution chamber and a return tubing in communication with said lower portion of said dilution chamber,
    a first valve in said sucking tubing,
    a second valve in said return tubing,
    a means to control said first and said second valves to draw liquid through said sucking tubing into said pumping tubing, and to return $^4$He II through said superleak to the lower portion of said dilution chamber, and return $^3$He rich liquid to the upper portion of said dilution chamber through said return conduit, and
    a heat load tube mounted in close thermal contact with said dilution chamber, and said heat exchanger.

5. Dilution refrigerator according to claim 4, characterized in that the said pump (9, 18, 19) during operation is immersed in a container (16) containing a bath of liquid $^4$He at a temperature below 2° K.

6. Dilution refrigerator according to claim 4, characterized in that two pumps (18, 19) are provided and connected respectively to said first and said second valves (4, 10, 6) so as to permit simultaneous suction and pumping of the $^4$He rich mixture of $^3$He-$^4$He from and to the dilution chamber (1), respectively, and for separating $^4$He from the mixture by passing it through the superleak (11).

7. Dilution refrigerator according to claim 4, characterized in that said pump (9, 18, 19) comprises two valves (26, 27) and a bellows (23) having an end plate (24) adapted for actuation by electromagnetic or cam means 8. Dilution refrigerator according to claim 4 characterized by an equalization bellows (53) connected to the suction tube (2) up-stream of the said valve (4).

9. Dilution refrigerator according to claim 4, characterized in that said first and said second valves (4, 6, 20, 22) comprise a gold ring (34) as the valve seat and a steel ball (35) as the valve plug, the ball (35) being attached to an actuator rod 33 connected to a pack of piezo-electric crystals 36 resting against a bias screw (39) enclosed in a bellows (38).

10. Dilution refrigerator according to claim 4, characterized in that the valves (4, 6, 10, 22) as well as the pump (9, 18, 19) are arranged to be actuated by means of individually associated cam/follower arrangements (41 through 46) and appertaining plungers (47 through 52).

11. Dilution refrigerator according to claim 4, characterized in that said heat load tube (15) extends through said heat exchanger (3) and into said dilution chamber (1) and that it is covered, at least where it is immersed in $^3$He rich mixture of $^3$He-$^4$He with a highly heat-conductive material such as sintered silver.

12. Dilution refrigerator according to claim 4, characterized in that said heat load tube (15) is welded to said dilution chamber (1) in contact with a highly heat-conductive heat coupler.

* * * * *